United States Patent
Chen et al.

(10) Patent No.: US 8,518,567 B2
(45) Date of Patent: Aug. 27, 2013

(54) AUTOMATIC BATTERY-OVERCHARGE POWER DISCONNECTION DEVICE AND BATTERY USING THE SAME

(75) Inventors: Chin-Ming Chen, Gueishan Township, Taoyuan County (TW); Xing-Fa Lin, Gueishan Township, Taoyuan County (TW)

(73) Assignee: Amita Technologies Inc Ltd., Taoyuan County (TW)

( * ) Notice: Subject to any disclaimer, the term of this patent is extended or adjusted under 35 U.S.C. 154(b) by 847 days.

(21) Appl. No.: 12/632,099

(22) Filed: Dec. 7, 2009

(65) Prior Publication Data
US 2011/0135977 A1    Jun. 9, 2011

(51) Int. Cl.
*H01M 2/00* (2006.01)

(52) U.S. Cl.
USPC .......................................................... 429/61

(58) Field of Classification Search
None
See application file for complete search history.

(56) References Cited

U.S. PATENT DOCUMENTS

| | | | |
|---|---|---|---|
| 5,711,865 A | * | 1/1998 | Caesar .......................... 205/628 |
| 2002/0149914 A1 | * | 10/2002 | Karasawa et al. ............. 361/749 |

FOREIGN PATENT DOCUMENTS

| | | | |
|---|---|---|---|
| JP | 2004327098 A | * | 11/2004 |
| TW | M275625 | * | 9/2005 |
| TW | M292169 | | 6/2006 |

* cited by examiner

*Primary Examiner* — Ula C Ruddock
*Assistant Examiner* — Daniel Gatewood
(74) *Attorney, Agent, or Firm* — Chun-Ming Shih; HDLS IPR Services

(57) ABSTRACT

An automatic battery-overcharge power disconnection device electrically coupled to a battery includes an insulating frame, a space formed by enclosing edges of the frame, two grooves formed on a lateral edge of the frame, a flexible board installed at another opposite lateral edge of the frame, an opening formed at an end of the flexible board, a knife portion disposed on an internal side of the opening; a symmetrically folded electro-conductive thin plate, having two half-plate portions and a folding portion between two half-plate portions, and passed into the opening of flexible board, such that the two half-plate portions are clamped at the flexible board, and the folding portion is situated opposite to the knife portion; two conductive electrodes, each having a connecting portion extended out from the conductive connecting portion freely, disposed in the two grooves respectively, and electrically coupled to the two half-plate portions.

6 Claims, 9 Drawing Sheets

AUTOMATIC BATTERY-OVERCHARGE POWER DISCONNECTION DEVICE AND BATTERY USING THE SAME

BACKGROUND OF THE INVENTION

1. Field of the Invention

The present invention relates to an automatic power disconnection of a battery, and more particularly to an automatic battery-overcharge power disconnection device and a battery having the automatic battery-overcharge power disconnection device.

2. Description of Prior Art

As mobile electronic devices become popular and have a high performance, a high-capacity battery is required and expected, and thus a lithium-ion battery using electrochemically doped lithium and dedoped carbon materials as an active substance for a negative electrode and lithium-containing transition metals as an active substance for a positive electrode is used extensively.

However, if such secondary lithium battery is overcharged, extra lithium ions will be extracted from the positive electrode, and an insertion of extra lithium ions will occur at the negative electrode to release lithium metal and form a very unstable high-performance oxide at the positive electrode side. When the battery voltage of the overcharged battery rises to a specific voltage value, an organic solvent in an electrolyte solution is decomposed to produce a large quantity of combustible gas and causes a rapid heat generating reaction and an abnormal heat generation of the battery. Obviously, such secondary lithium battery has a safety issue. In view of the aforementioned reasons, the inventor of the present invention based on the aforementioned subject to make novel improvements.

In a conventional protection structure for rechargeable batteries as disclosed in Taiwan Pat. Nos. M292169 and M275625 issued to the inventor of the present invention, a lithium battery protection structure as disclosed in Taiwan Pat. No. M292169 comprises an abnormity detection circuit and an optical coupler circuit, wherein the abnormality detection circuit is provided for examining the voltage of a rechargeable battery and outputting a detect signal, and the optical coupler circuit is electrically coupled to the abnormality detection circuit for adjusting an impedance of the optical coupler circuit according to the detect signal to disconnect the rechargeable battery from the connection of an external circuit or to charge or discharge the rechargeable battery. In addition, a protection structure for a rechargeable battery as disclosed in China Pat. No. M275625 comprises a first protection loop and a second protection loop, wherein the first protection loop includes a main current load and a battery connected to a main circuit, and a thermocouple induction switch connected to the battery and the main circuit, and the second protection loop includes a protection circuit and a heater, and the protection circuit is connected to the main circuit for detecting and comparing a voltage value of the battery to output an ON signal, and the heater is connected to the protection circuit for performing a heating operation when the thermocouple induction switch is turned on. At present, a mechanical protection device is used mostly in a cylindrical hard-shell lithium battery, such that if the lithium battery is overcharged, an internal pressure will be increased to start the operation of a pressure release valve to release the pressure and break the conductive handle in the battery.

Although the aforementioned overcharge protection structure of the lithium battery has the function of protecting the battery from being overcharged to a specific level, the components and circuits will be damaged or worn out and will lose their original functions after a long time of use. Furthermore, the mechanical safety protection device of the cylindrical hard-shell lithium battery cannot be used in a soft-shell lithium battery, and each of the foregoing protection structures or devices requires complicated and troublesome assembling and installation. Therefore, it is a main subject for the present invention to disconnect the power of a battery safely when any component or circuit is damaged and to overcome the issue of a high price by using a simple structure.

In view of the shortcomings of the prior art, the inventor of the present invention based on years of experience in the related field to conduct extensive researches and experiments, and finally developed an automatic battery-overcharge power disconnection device and a battery thereof in accordance with the present invention and provide a feasible effective solution to overcome the shortcomings of the prior art.

SUMMARY OF THE INVENTION

Therefore, it is a primary objective of the present invention to provide an automatic battery-overcharge power disconnection device and a battery thereof, wherein the expansion of volume of an overcharged battery is used for disconnect a serially or parallelly connected electric conduction loop to achieve the safety effect of preventing an overcharge. The invention not just simplifies the overall structure only, but also reduces the cost significantly, and prevents explosions and other substantial damages of the battery effectively.

To achieve the foregoing objective, the present invention provides an automatic battery-overcharge power disconnection device, comprising an insulating frame, an electro-conductive thin plate and two conductive electrodes; wherein the insulating frame includes an enclosed space formed by enclosing frame edges of the insulating frame, two grooves disposed on a frame edge and in opposite directions with each other, a flexible board installed on another opposite frame edge and extended into the enclosed space, an opening formed at an end of the flexible board, and a knife portion disposed at the opening and proximate to an internal side at an end of the flexible board; and the electro-conductive thin plate includes two half-plate portions symmetrically folded, and a folding portion formed and connected between two half-plate portions, wherein the electro-conductive thin plate is passed into the opening of the flexible board, such that the two half-plate portions are clamped at the ends of the flexible board, and the folding portion is situated at a position opposite to the knife portion of the flexible board; and each of the two conductive electrodes includes a connecting portion extended out from the conductive connecting portion freely, and the conductive connecting portions of the two conductive electrodes are installed into two grooves of the insulating frame respectively, and the two connecting portions are electrically coupled to the two half-plate portions of the electro-conductive thin plate respectively for a fixation, such that the electro-conductive thin plate and the two conductive electrodes form an electric conduction loop if they are stacked, and connected in series or in parallel with the battery. Once if the battery is overcharged and expanded, the flexible board will pull the electro-conductive thin plate, and the knife portion cuts through the folding portion of the electro-conductive thin plate to disconnect the electric conduction loop formed by the electro-conductive thin plate and the two conductive electrodes.

To achieve the foregoing objective, the present invention also provides a battery with an automatic battery-overcharge power disconnection device, and comprises two power disconnection devices and at least one battery; wherein each power disconnection device includes the aforementioned components, and the battery includes a main body disposed in the enclosed space of the two power disconnection devices and an anode handle and a cathode handle installed in the main body, and contacted with the conductive connecting portions of the two power disconnection devices respectively, and the flexible board of the two power disconnection devices is attached onto a surface of the main body of the battery.

To achieve the foregoing objective, the present invention provides a battery with an automatic battery-overcharge power disconnection device, and comprises a power disconnection device, at least one battery, and a box; wherein the power disconnection device includes the aforementioned components, and the battery includes a main body disposed in the enclosed space of the power disconnection device, and an anode handle and a cathode handle installed on the main body and contacted with conductive connecting portions of two power disconnection devices respectively. In addition, a containing space is formed in the box and provided for containing and installing the battery, and the power disconnection device is pressed onto a surface of the main body of the battery.

DETAILED DESCRIPTION OF THE INVENTION

The technical characteristics, features and advantages of the present invention will become apparent in the following detailed description of the preferred embodiments with reference to the accompanying drawings. The drawings are provided for reference and illustration only, but not intended for limiting the present invention.

Figure 1:
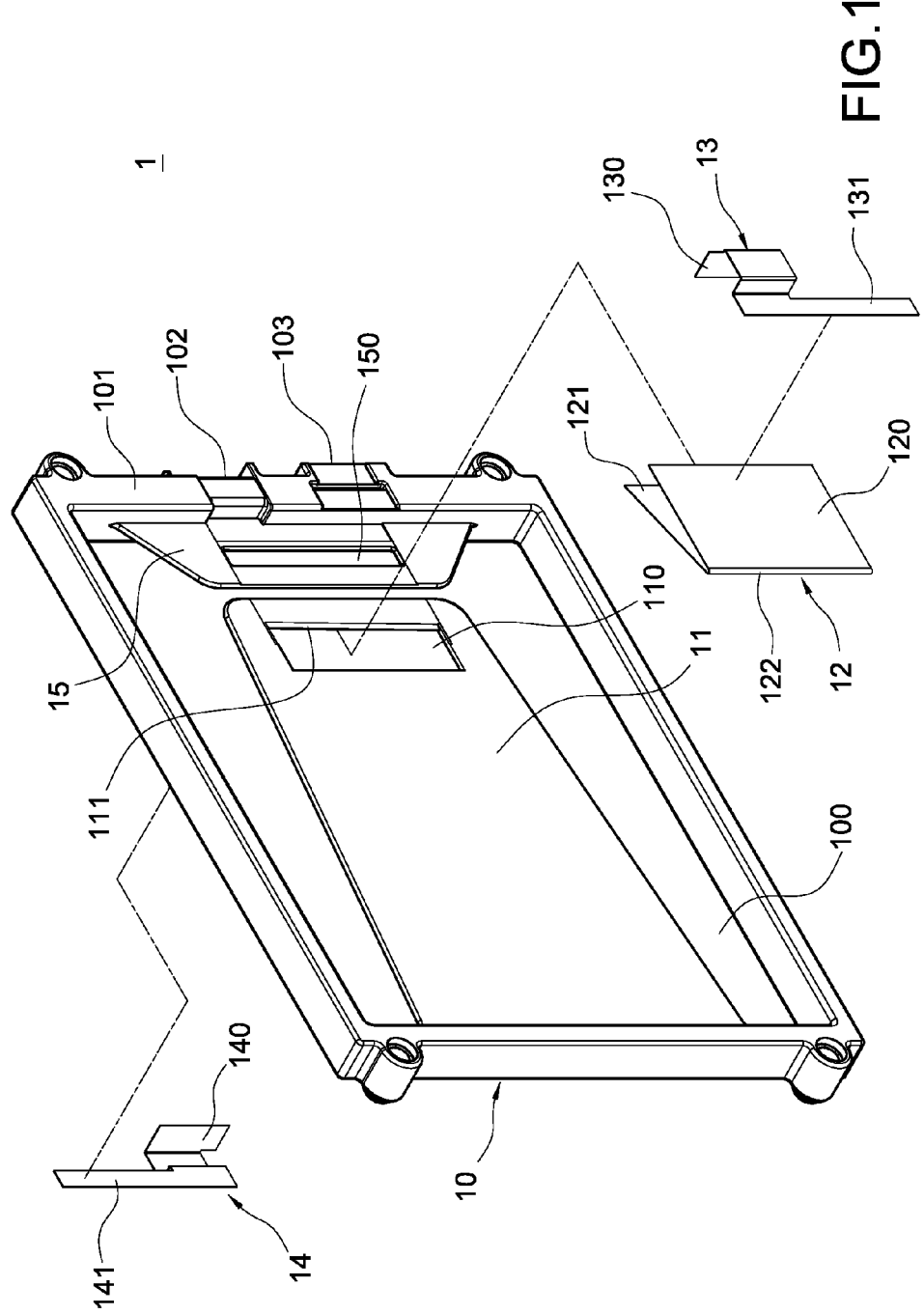
FIG. 1 is an exploded view of a power disconnection device in accordance with a first preferred embodiment of the present invention.
Figure 2:
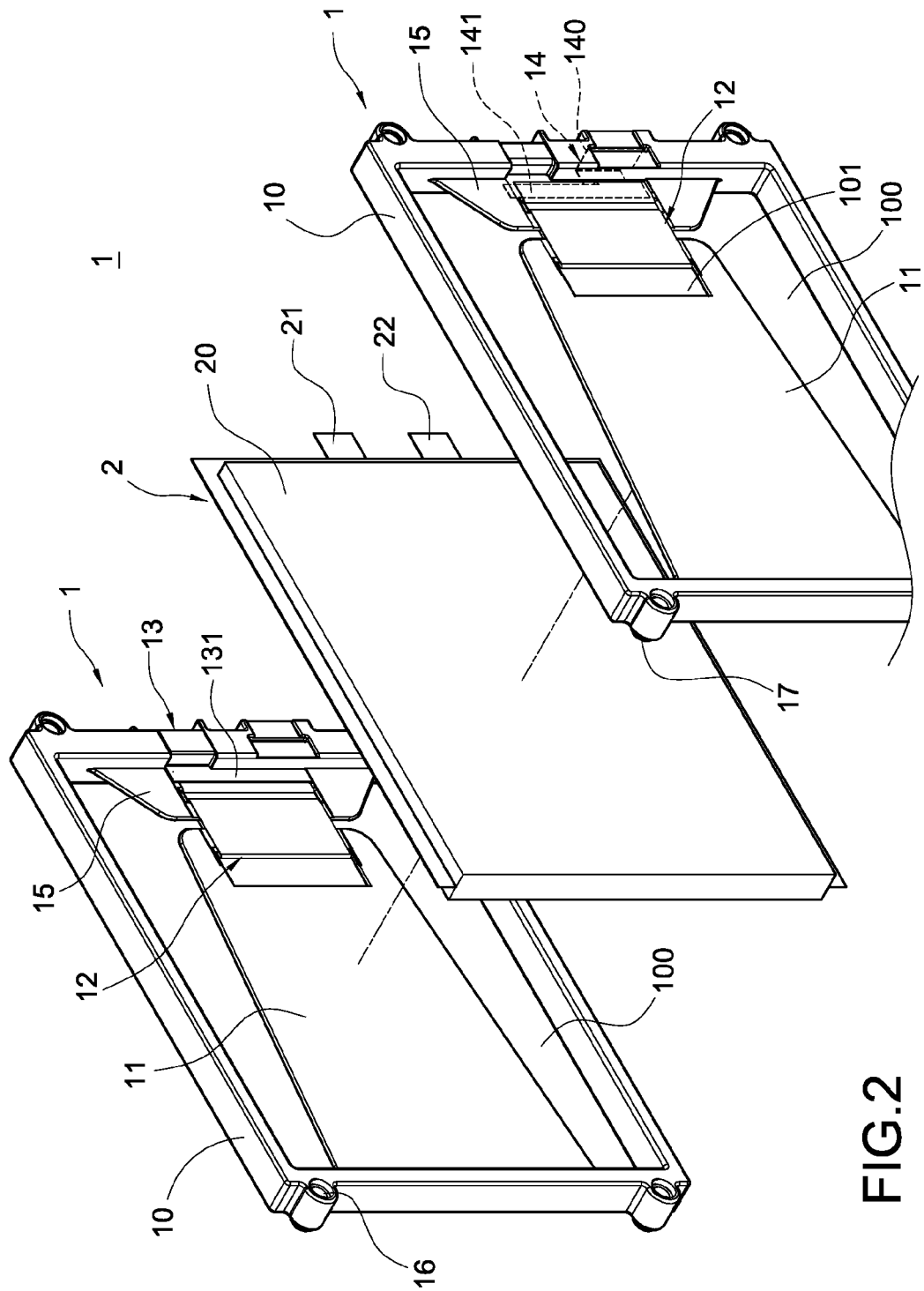
FIG. 2 is an exploded view of a battery and a power disconnection device in accordance with a first preferred embodiment of the present invention.

With reference to FIG. 1 for an exploded view of a power disconnection device in accordance with a first preferred embodiment of the present invention, the present invention provides an automatic battery-overcharge power disconnection device and a battery thereof, wherein the power disconnection device 1 is provided for stacking and electrically connecting a battery 2 (as shown in FIG. 2) in series or in parallel, so that if the battery 2 is overcharged, the function of an automatic power disconnection can be achieved. The power disconnection device 1 includes an insulating frame 10, an electro-conductive thin plate 12, and two conductive electrodes 13, 14.

The insulating frame 10 made of an insulating material such as plastics, and includes a frame edge 101 slightly larger than the main body 20 of the battery 2, and an enclosed space 100 formed in the insulating frame 10 for stacking and installing the battery 2 in the insulating frame 10. The insulating frame 10 includes two grooves 102, 103 formed on a frame edge 101 and in opposite directions with each other, and provided for installing the two conductive electrodes 13, 14 to be used as anode and cathode. In addition, the insulating frame 10 further includes a flexible board 11 installed on another opposite frame edge 101 and extended into the enclosed space 100, an opening 110 formed on an end of the flexible board 11, and a knife portion 111 formed on an internal side of the opening 110 and proximate to an end of the flexible board 11, for disconnecting an electric conduction loop of an overcharged battery 2.

The electro-conductive thin plate 12 is formed by a copper foil and includes two half-plate portions 120, 121 symmetrically folded with each other, and a folding portion 122 is coupled between the two half-plate portions 120, 121. The electro-conductive thin plate 12 is passed into the opening 110 of flexible board 11, and the two folded half-plate portions 120, 121 are clamped to an end of the flexible board 11, such that the folding portion 122 is disposed at a position opposite to the knife portion 111 of the flexible board 11.

The two conductive electrodes 13, 14 can be formed by a copper foil individually, and each conductive electrode 13, 14 has a conductive connecting portion 130, 140 disposed in the grooves 102, 103 of the insulating frame 10 respectively, and a connecting portion 131, 141 extended out from the conductive connecting portion 130, 140 freely, and the connecting portions 131, 141 of the two conductive electrodes 13, 14 are electrically coupled to the two half-plate portions 120, 121 of the electro-conductive thin plate 13 respectively for a fixation. If the anode handle 21 and the cathode handle 22 on the battery 2 are in contact with the conductive connecting portions 130, 140 of the two conductive electrodes 13, 14 respectively, an electric conduction loop is formed.

In addition, the insulating frame 10 includes a fixing plate 15 installed at a lateral frame edge 101 opposite to the flexible board 11 and protruded towards the flexible board 11, and the two half-plate portions 120, 121 of the electro-conductive thin plate 12 are clamped onto the fixing plate 15, and the fixing plate 15 has a through hole 150 disposed thereon and provided for the two half-plate portions 120, 121 of the electro-conductive thin plate 12 to be attached with each other through the through hole 150, and the frame edge 101 of the insulating frame 10 further includes a positioning hole 16 and a corresponding positioning pillar 17 for stacking and coupling the plurality of power disconnection devices 1 with the battery 2.

Figure 3:
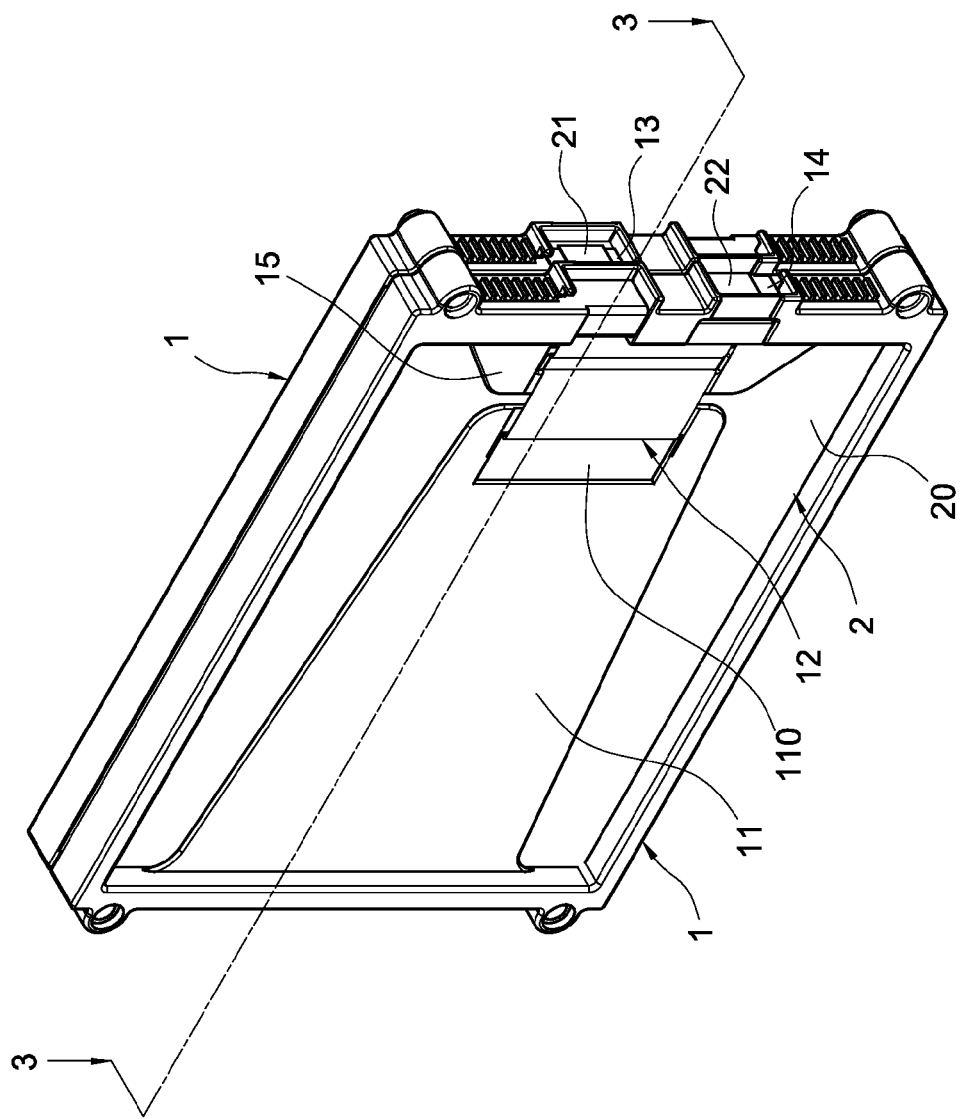
FIG. 3 is a perspective view of a battery and a power disconnection device in accordance with a first preferred embodiment of the present invention.
Figure 4:
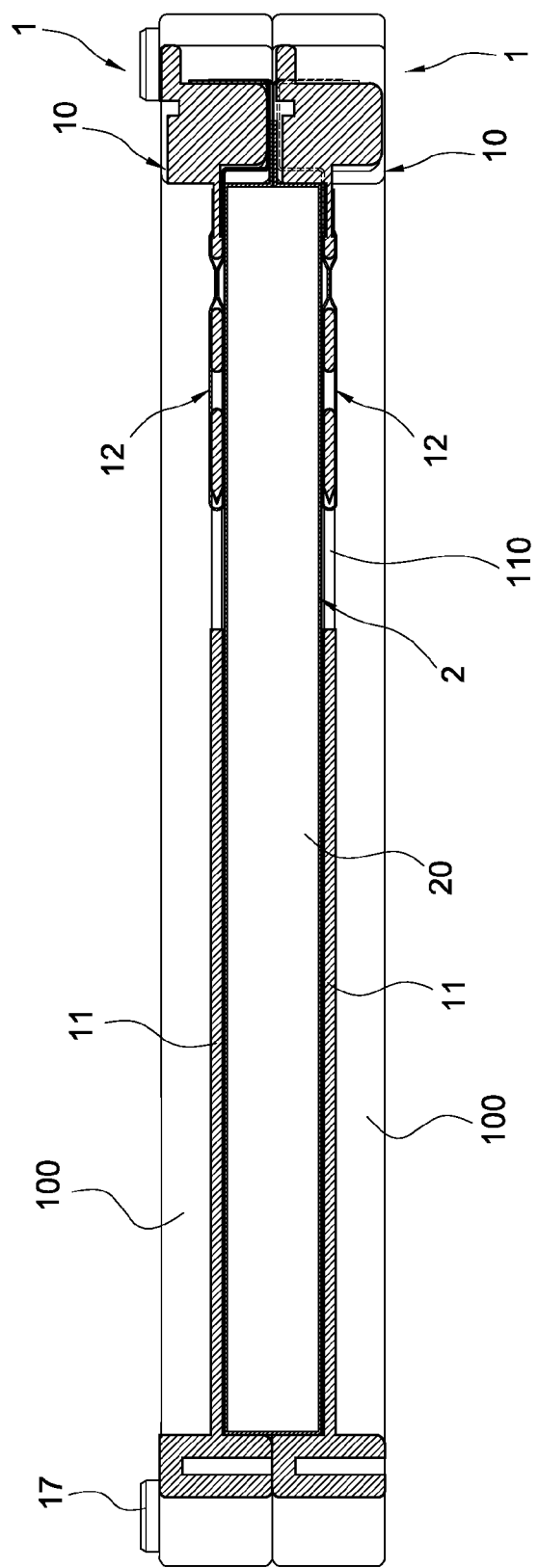
FIG. 4 is a cross-sectional view of Section 3-3 as depicted in FIG. 3.
Figure 5:
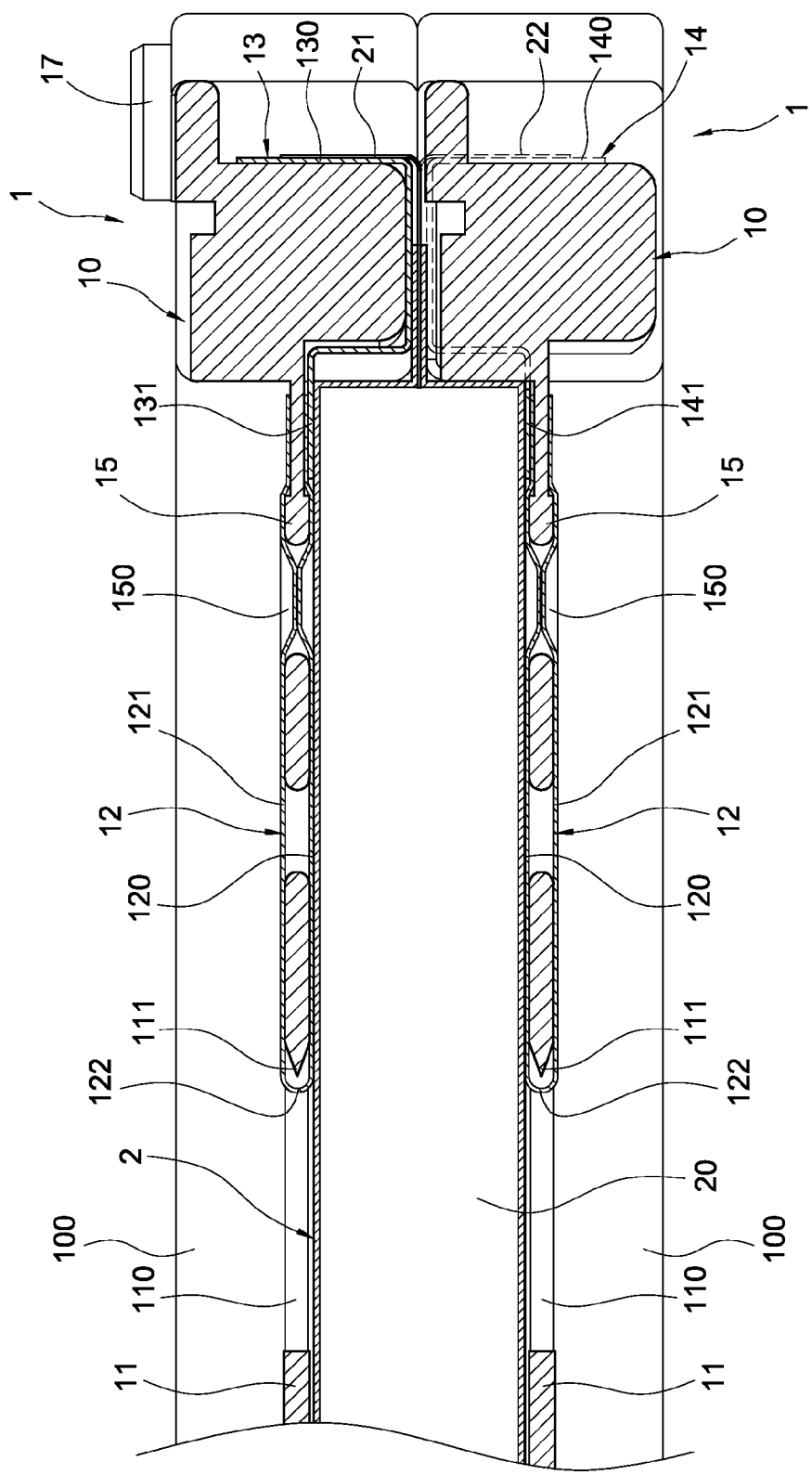
FIG. 5 is an enlarged view of a portion of FIG. 4.

With reference to FIGS. 2 and 3 for a battery 1 clamped by two power disconnection devices 2 into a stacked form in accordance with a first preferred embodiment of the present invention, the battery 2 has a flat main body 20, an anode handle 21 and a cathode handle 22 installed at the top of the main body 20 and contacted with conductive connecting portions 130, 140 of the two power disconnection devices 1 (as shown in FIG. 3), so that two grooves 102, 103 of the conductive connecting portions 130, 140 can be installed in opposite directions. With reference to FIGS. 4 and 5 for the layout of the electro-conductive thin plate 12, the two conductive electrodes 13, 14, and the flexible board 11 of the present invention, the flexible board 11 of the two power disconnection devices 1 is attached onto a surface of the main body 20 of the battery 2.

With the aforementioned structure, an automatic battery-overcharge power disconnection device and its battery in accordance with the present invention can be achieved.

Figure 6:
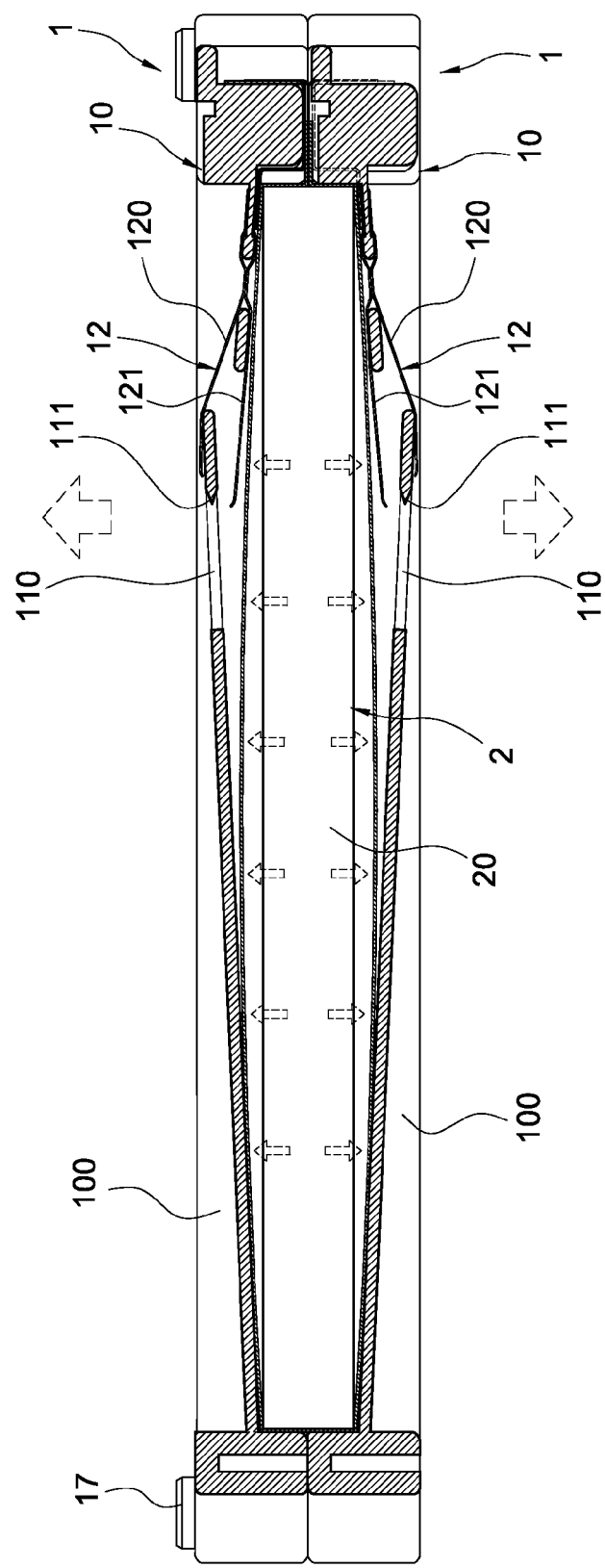
FIG. 6 is a schematic view of an automatic power disconnection taken place for an overcharged battery as depicted in FIG. 4.

With reference to FIG. 6, if the battery 2 is overcharged, the volume of the main body 20 of the battery 2 will be expanded to produce a deformation to push the flexible board 11 outward, such that the flexible board 11 pulls the electro-conductive thin plate 12. Now, the folding portion 122 of the electro-conductive thin plate 12 is situated at a position opposite to the knife portion 111 of the flexible board 11, such that if the flexible board 11 pulls the electro-conductive thin plate 12, the knife portion 111 will cut through the folding portion 122, and the conductive loop formed by the electro-conductive thin plate 12 and the two conductive electrodes 13, 14 is disconnected to achieve a power disconnection and prevent accidents caused by the overcharge, so as to provide a safe automatic power disconnection function.

Figure 7:
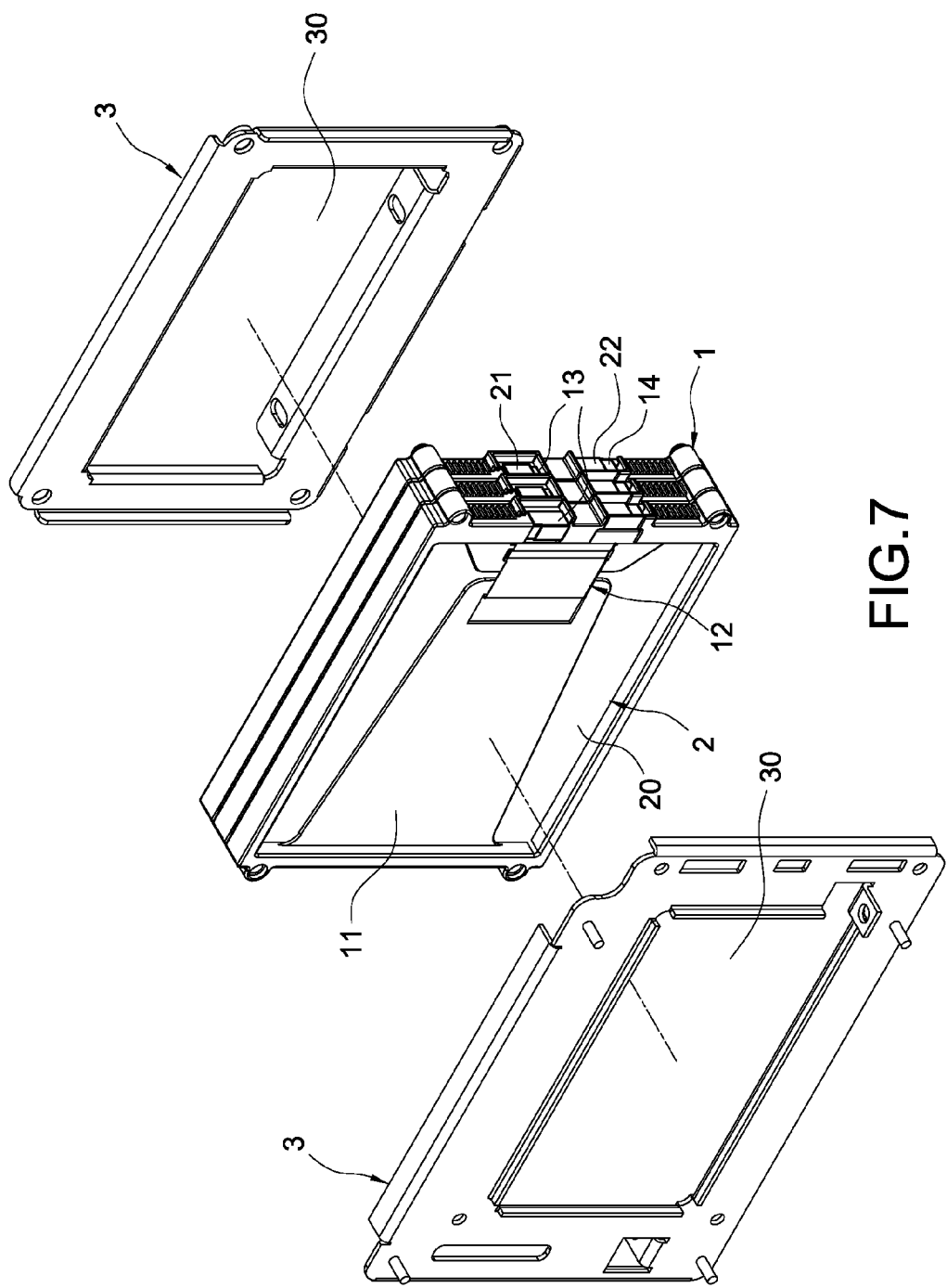
FIG. 7 is an exploded view of a power disconnection device applied to a serial/parallel connection in accordance with a first preferred embodiment of the present invention.

With reference to FIG. 7, if a plurality of batteries 2 are connected in series or in parallel with each other, the present invention further includes two casings 3 for clamping the power disconnection devices 1 in addition to the plurality of power disconnection devices 1 to improve the coupling strength between the power disconnection devices 1. Each of the two casings 3 has a hollow portion 30 disposed opposite to the flexible board 11 for providing a space for the expansion and deformation of the main body 20 of the battery 2, after the plurality of batteries 2 clamped by the power disconnection devices 1 are overcharged and expanded.

Figure 8:
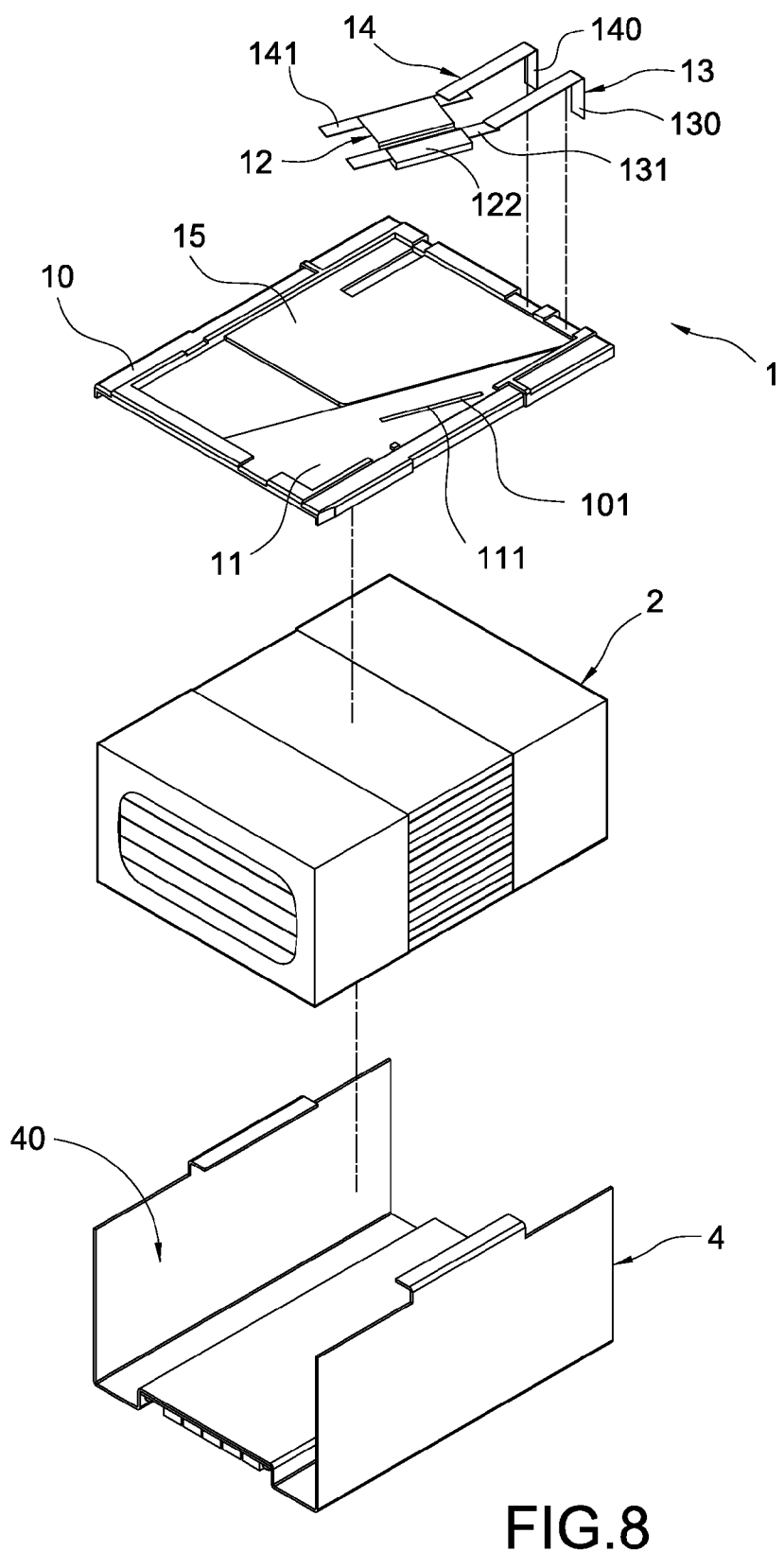
FIG. 8 is an exploded view of a battery and a power disconnection device in accordance with a second preferred embodiment of the present invention.
Figure 9:
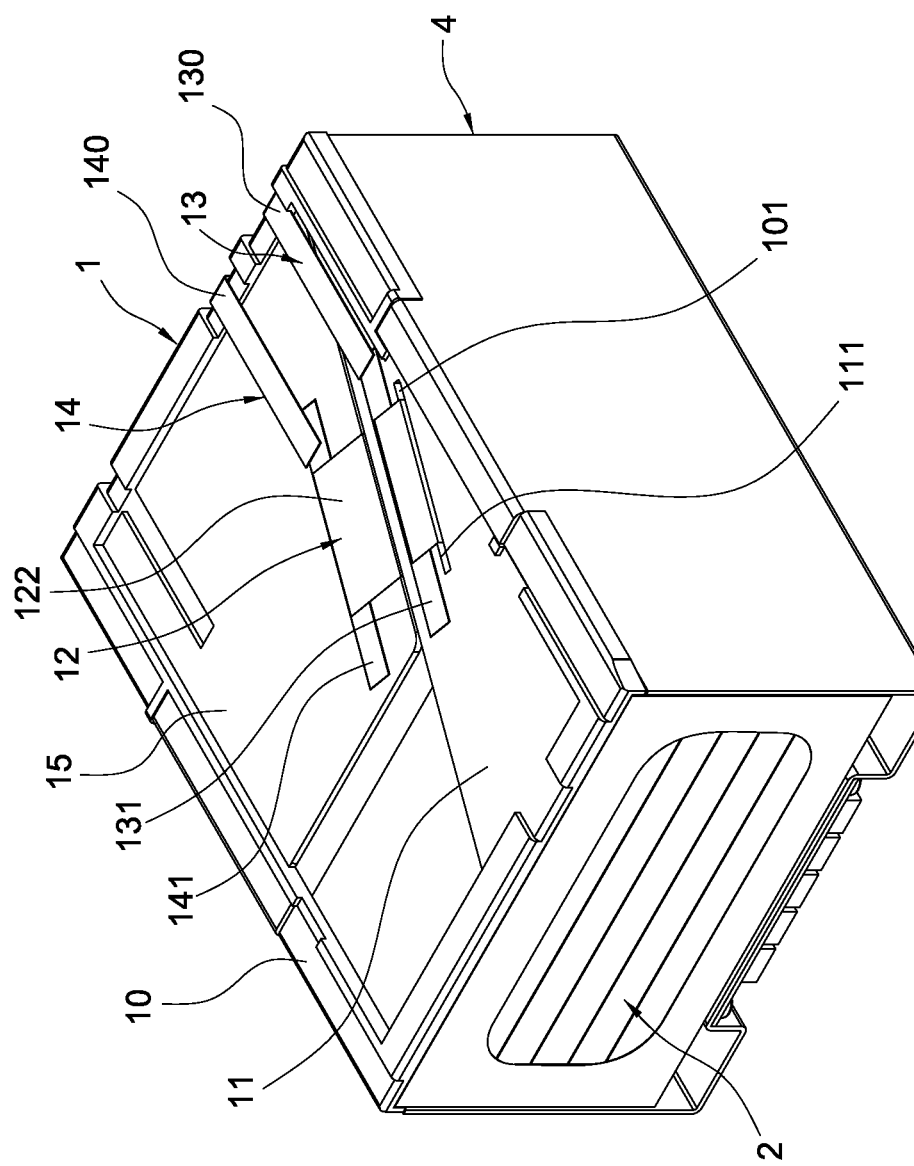
FIG. 9 is a perspective view of a battery and a power disconnection device in accordance with a second preferred embodiment of the present invention.

With reference to FIGS. 8 and 9 for an exploded view and a perspective view of a battery and a power disconnection device in accordance with a second preferred embodiment of the present invention respectively, the present invention can also integrate a single power disconnection device 1 with a box 4 to form one or more serially or parallely connected batteries 2; wherein this preferred embodiment discloses another embodiment of the power disconnection device 1, and the main difference resides on that the flexible board 11 and the fixing plate 15 are installed at opposite diagonal positions in the insulating frame 10, and corresponding cut edges of the flexible board 11 and the fixing plate 15 are inclined, and each battery 2 can be connected in series or in parallel into a stacked form to be contained in the box 4. The box 4 has a containing space 40 formed therein, wherein the height of the containing space 40 is precisely equal to the total thickness of the stacked batteries 2 for containing each battery 2 in the box 4, and a power disconnection device 1 is installed into the containing space 40 of the box 4 and pressed onto the top of each battery 2. Since each battery 2 is pressed at the power disconnection device 1 and the containing space 40 of the box 4, the flexible board 11 is pushed outward to pull the electro-conductive thin plate 12 to cut through the electro-conductive thin plate 12 when each battery 2 is overcharged and expanded. As a result, the automatic power disconnection can be achieved when the battery 2 is overcharged.

In summation of the description above, the present invention can achieve the expected objectives, overcome the shortcomings of the prior art, and comply the patent application requirements, and is thus duly filed for patent application.

The present invention is illustrated with reference to the preferred embodiment and not intended to limit the patent scope of the present invention. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. An automatic battery-overcharge power disconnection device, comprising:

an integral insulating frame, having an enclosed space formed by enclosing frame edges of the insulating frame, two grooves formed on a first frame edge, a flexible flat board extended from a second frame edge, which is opposite to the first frame edge, into the enclosed space, an opening formed on the flexible flat board and located at an end of the flexible flat board, and a knife portion formed on an internal side of the opening and proximate to an end of the flexible flat board;

an electro-conductive thin plate, having two half-plate portions symmetrically folded, and a folding portion formed and connected between the two half-plate portions, and the electro-conductive thin plate being passed into opening of the flexible flat board, such that the two half-plate portions clamp on the end of the flexible flat board, and the folding portion is situated at a position adjacent to the knife portion of the flexible flat board; and two conductive electrodes, each having a conductive connecting portion, and a connecting portion extended out from the conductive connecting portion, wherein the conductive connecting portions of the two conductive electrodes are disposed on two grooves of the insulating frame respectively, and the two connecting portions being electrically coupled to the two half-plate portions of the electro-conductive thin plate for a fixation, respectively;

thereby the electro-conductive thin plate and the two conductive electrodes form an electric conduction loop through the folding portion if the electro-conductive thin plate and the two conductive electrodes are connected with an anode handle and a cathode handle of a battery, and once if the battery is overcharged and expanded to push on the flexible flat board, the end of the flexible flat board will in turn push against the electro-conductive thin plate, and the knife portion will cut the electro-conductive thin plate into the two half-plate portions at the folding portion to disconnect an electric conduction loop formed by the electro-conductive thin plate and the two conductive electrodes.

2. The automatic battery-overcharge power disconnection device of claim 1, wherein a fixing plate is extended from the first frame edge into the enclosed space and towards the flexible flat board, and the two half-plate portions of the electro-conductive thin plate clamp on the fixing flat plate.

3. The automatic battery-overcharge power disconnection device of claim 2, wherein the fixing plate includes a through hole formed thereon, and the two half-plate portions of the electro-conductive thin plate are attached and coupled with each other through the through hole.

4. The automatic battery-overcharge power disconnection device of claim 1, wherein a corner of the insulating frame includes a positioning hole and a corresponding positioning pillar at two opposite sides.

5. The automatic battery-overcharge power disconnection device of claim 1, wherein the electro-conductive thin plate is formed by a copper foil.

6. The automatic battery-overcharge power disconnection device of claim 1, wherein the two conductive electrodes are formed individually by a copper foil.

* * * * *